(12) United States Patent
Hayakawa (10) Patent No.: US 11,122,169 B2
(45) Date of Patent: Sep. 14, 2021

(54) PHOTO ALBUM CREATION SYSTEM, PHOTO ALBUM CREATION METHOD, AND NON-TRANSITORY COMPUTER-READABLE STORAGE MEDIUM

(71) Applicant: CANON KABUSHIKI KAISHA, Tokyo (JP)

(72) Inventor: Mizuki Hayakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/797,444

(22) Filed: Feb. 21, 2020

(65) Prior Publication Data

US 2020/0288023 A1    Sep. 10, 2020

(30) Foreign Application Priority Data

Mar. 8, 2019 (JP) .............................. JP2019-043040

(51) Int. Cl.
*H04N 1/387* (2006.01)
*H04N 1/00* (2006.01)
*H04N 1/60* (2006.01)

(52) U.S. Cl.
CPC ..... *H04N 1/00196* (2013.01); *H04N 1/00167* (2013.01); *H04N 1/00482* (2013.01); *H04N 1/6008* (2013.01)

(58) Field of Classification Search
CPC ........... H04N 1/00196; H04N 1/00167; H04N 1/00482
USPC ................................... 358/1.9, 1.2, 1.18, 2.1
See application file for complete search history.

(56) References Cited

U.S. PATENT DOCUMENTS

| 8,493,610 | B2 | 7/2013 | Kitagawa et al. | |
|---|---|---|---|---|
| 10,366,520 | B2 | 7/2019 | Hayakawa | |
| 10,498,909 | B2 | 12/2019 | Hayakawa | |
| 2006/0197963 | A1* | 9/2006 | Royal | G06T 11/60 358/1.2 |
| 2009/0148064 | A1* | 6/2009 | Schulz | G06T 3/4038 382/284 |
| 2016/0119488 | A1* | 4/2016 | Chen | G06F 16/5854 358/1.18 |
| 2018/0218526 | A1 | 8/2018 | Hayakawa | |
| 2019/0104221 | A1 | 4/2019 | Hayakawa | |
| 2019/0324695 | A1 | 10/2019 | Hayakawa | |
| 2020/0004774 | A1 | 1/2020 | Hayakawa | |

FOREIGN PATENT DOCUMENTS

JP          2000-132151 A    5/2000

* cited by examiner

*Primary Examiner* — Jamares Q Washington
(74) *Attorney, Agent, or Firm* — Venable LLP (57) ABSTRACT

There is provided a photo album creation system configured to create album data used to create an album in which a plurality of images are laid out accepts editing for an image used for the album data; decides, based on information of each of the plurality of images, a resolution when printing the album before the acceptance of the editing; decides, based on the resolution decided by the first decision unit, a threshold used to make a warning; and makes a warning for an image whose resolution is less than the threshold based on a result of editing performed by the editing unit for the image used for the album data.

14 Claims, 6 Drawing Sheets

| No | x COORDINATE VALUE | y COORDINATE VALUE | WIDTH | HEIGHT |
|---|---|---|---|---|
| 1 | 15.0 | 41.0 | 120.0 | 67.5 |
| 2 | 165.0 | 41.0 | 120.0 | 67.5 |

(UNITS:mm)

FIG. 9

| No | x COORDINATE VALUE | y COORDINATE VALUE | WIDTH | HEIGHT |
|---|---|---|---|---|
| 1 | 35.0 | 52.25 | 80.0 | 45 |
| 2 | 185.0 | 52.25 | 80.0 | 45 |

(UNITS:mm)

PHOTO ALBUM CREATION SYSTEM, PHOTO ALBUM CREATION METHOD, AND NON-TRANSITORY COMPUTER-READABLE STORAGE MEDIUM

BACKGROUND OF THE INVENTION

Field of the Invention

The present invention relates to a photo album creation system, a photo album creation method, and a non-transitory computer-readable storage medium.

Description of the Related Art

When printing image data by a printer, if the number of pixels of the image data is equal to or more than the resolution (to be referred to as a "print resolution" hereinafter) at the time of printing by the printer, the image data can be output at print quality making advantage of printer performance. On the other hand, when outputting image data whose number of pixels is less than the print resolution of the printer, the print performance of the printer cannot sufficiently be exploited. For example, Japanese Patent Laid-Open No. 2000-132151 proposes a method of performing printing after it is confirmed in advance with the user about the print resolution.

Japanese Patent Laid-Open No. 2000-132151 discloses a technique of implementing printing desired by a user by displaying a warning for the user. On the other hand, various kinds of image data are used in printing, and there is demand for a more convenient warning display.

SUMMARY OF THE INVENTION

One aspect of the present invention provides a photo album creation system configured to create album data used to create an album in which a plurality of images are laid out, comprising: an editing unit configured to accept editing for an image used for the album data; a first decision unit configured to decide, based on information of each of the plurality of images, a resolution when printing the album before the acceptance of the editing; a second decision unit configured to decide, based on the resolution decided by the first decision unit, a threshold used to make a warning; and a notification unit configured to make a warning for an image whose resolution is less than the threshold based on a result of editing performed by the editing unit for the image used for the album data.

According to the present invention, it is possible to improve user convenience when performing printing.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

[System Arrangement]

An arrangement example of a system according to this embodiment will be described with reference to FIG. 1. In the system according to this embodiment, an external server 102 and an information processing apparatus 104 are communicably connected via a network 103. The information processing apparatus 104 functions as a photo album creation system capable of creating album data that causes a printer 101 or 105 to print an album (a photo album or a photo book) using one or a plurality of input image data. The created album data can be output as print data or uploaded to the external server 102. In this embodiment, an arrangement in which an application configured to create an album is provided in the information processing apparatus 104 will be described as an example. However, the present invention is not limited to this. For example, a service for creating an album may be provided as a Web application (Web service) in the external server 102. In this case, a screen of the Web application, and the like are displayed on a Web browser of the information processing apparatus.

The information processing apparatus 104 includes a ROM (Read Only Memory) 109, a RAM (Random Access Memory) 110, and a CPU (Central Processing Unit) 111. In addition, the information processing apparatus 104 includes input/output interfaces (not shown) used to connect the printer 105, a monitor 106, an input device 107, a storage device 108, and the network 103. The CPU 111 executes an operating system program (to be abbreviated as an OS hereinafter) stored in the storage device 108, thereby controlling the entire information processing apparatus 104. Additionally, the CPU 111 executes programs stored in the ROM 109 or the RAM 110, thereby implementing the functional components of the information processing apparatus 104, calculating and processing information, and controlling and executing hardware. The ROM 109 stores various kinds of programs corresponding to the functions provided by the information processing apparatus 104. The RAM 110 functions as the work memory of the CPU 111 and stores various kinds of programs.

The network 103 is a communication network connected to the information processing apparatus 104 and the external server 102 and configured to transmit information between the apparatuses. The external server 102 includes an input/output interface (not shown) used to connect the printer 101, and is connected to the printer 101. Album data created by the information processing apparatus 104 is uploaded to the external server 102 via the network 103. Upon accepting a print instruction for the uploaded album data, the external server 102 outputs print data of the album data to the printer 101. For example, the external server 102 is an album order receiving/management server. A user uploads album data created by the information processing apparatus 104 of his/her own to the external server 102. After a necessary album purchase procedure is performed, the printer 101 outputs the data. After that, the output printed product (album) is bound into a book and delivered to the user.

The printer 105 is a printer used to print data, without intermediating the network 103, based on album data created by the information processing apparatus 104. The information processing apparatus 104 may print created album data by the printer 105 held by the user himself/herself, and the printed product may be bound and finished into an album by the user. The monitor 106 is a display device that displays image information based on album data output by the information processing apparatus 104. The input device 107 is an input device such as a keyboard or a pointing device used for input to the information processing apparatus 104. Depending on the form of the input device 107, the input device 107 may have a touch panel configuration integrated with a monitor. The storage device 108 is a storage device such as an HDD (Hard Disk Drive) or an SSD (Solid State Drive) that stores image data or template data.

Figure 1:
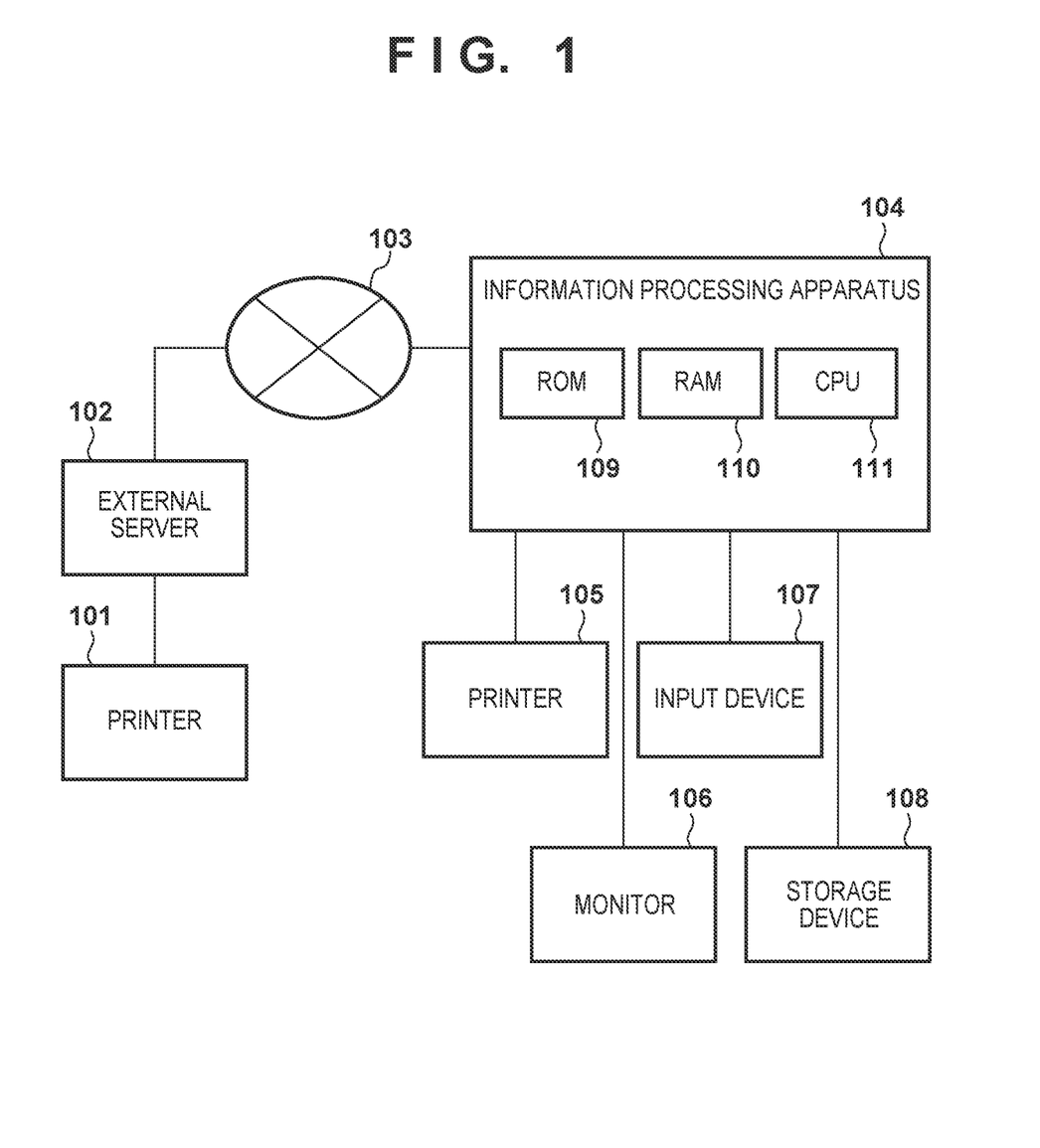
FIG. 1 is a view showing an arrangement example of a system according to the first embodiment.

FIG. 1 shows the information processing apparatus 104, the monitor 106, the input device 107, and the storage device 108 as separate components. However, these may be integrated depending on the form of the information processing apparatus. Additionally, FIG. 1 shows the printer 101, the external server 102, and the information processing apparatus 104 each including one apparatus. However, the present invention is not limited to this arrangement, and a plurality of apparatuses may be connected.

[Processing Procedure]

Figure 2:
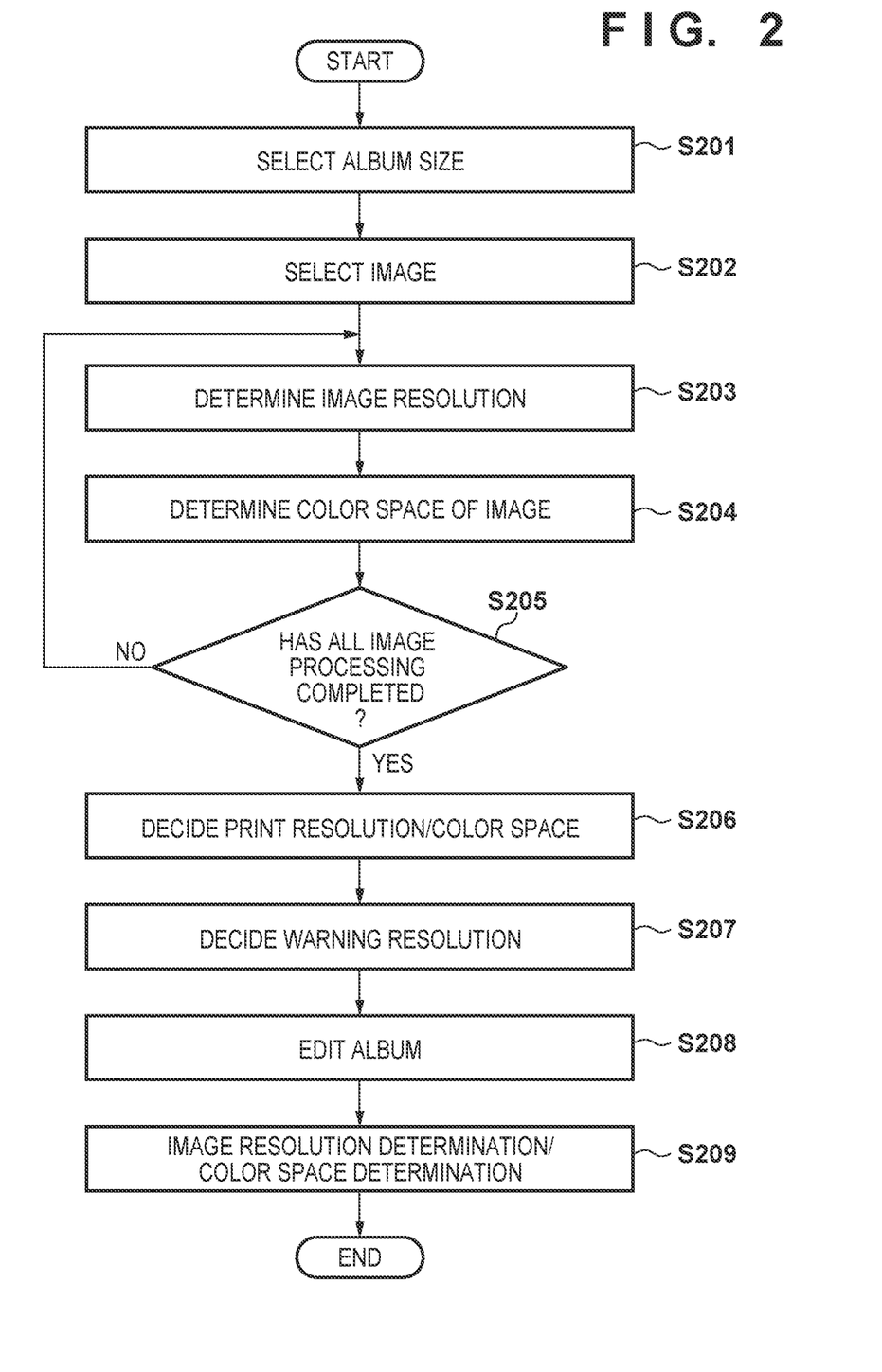
FIG. 2 is a flowchart of processing according to the first embodiment.

FIG. 2 is a flowchart of processing according to this embodiment. FIG. 2 is implemented when, for example, the CPU 111 reads out and executes a program corresponding to an album creation application installed in the information processing apparatus 104. Note that as described above, the function for creating an album may be provided, for example, as a Web application by the external server 102, and the information processing apparatus 104 may access the external server 102 via a Web browser (not shown) to use the function. When the above-described application is activated, and the user instructs creation of an album, the following processing is executed.

Figure 3:
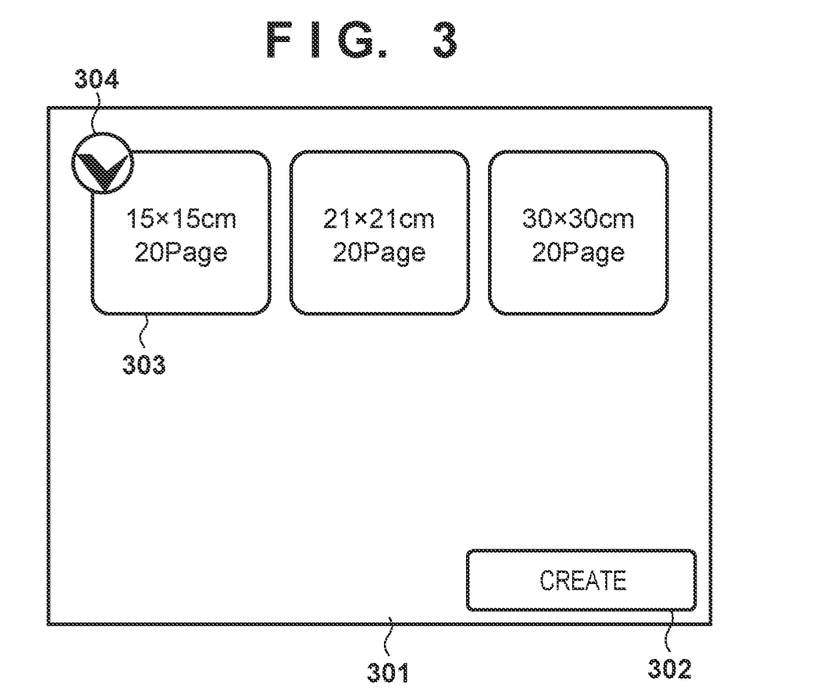
FIG. 3 is a view showing an example of a UI for commercial material selection according to the first embodiment.

In step S201, the information processing apparatus 104 accepts, from the user, selection of the size of an album to be created. For example, the information processing apparatus 104 displays a commercial material selection screen 301 shown in FIG. 3, and accepts selection from the user. In the commercial material selection screen 301 shown in FIG. 3, a plurality of buttons 303 each corresponding to a candidate of a selectable commercial material (album size) are displayed. Note that the selectable commercial material sizes and information concerning the number of pages are defined in advance. For a designated button, a checkmark 304 representing that is displayed. When a create button 302 is pressed, selection by the designated size can be instructed.

In step S202, the information processing apparatus 104 accepts, from the user, selection of image data to be used for album data. For example, the information processing apparatus 104 displays an editing screen 401 shown in FIG. 4, and accepts image selection from the user. For example, when image data or a folder including one or a plurality of image data is dragged and dropped to an image display area 402 provided in the editing screen 401, selection of image data can be accepted. Alternatively, selection of image data may be accepted by independently displaying an image selection UI (not shown) to display a list of images in the information processing apparatus 104 and causing the user to select image data. Note that the image selection method is not particularly limited, and any other method may be used.

Figure 4:
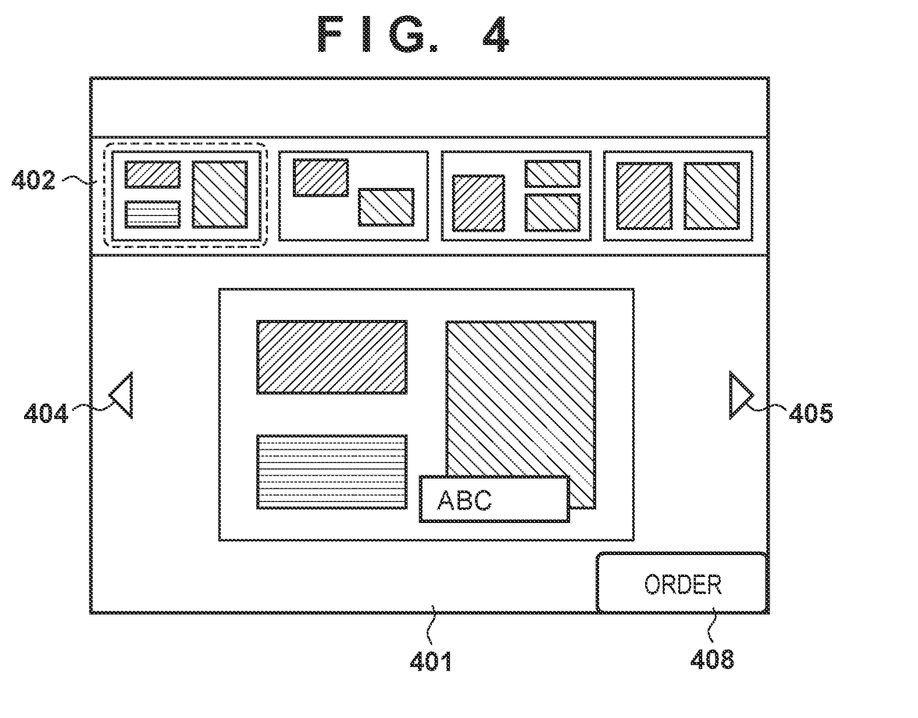
FIG. 4 is a view showing an example of a UI for editing according to the first embodiment.

Additionally, in the editing screen 401, selected image data can be enlarged and displayed at the center of the editing screen 401. In addition, the displayed image data can be switched by pressing switch buttons 404 and 405. By pressing an order button 408, the order of a photo album using selected image data can be instructed. Furthermore, in the editing screen 401, image editing as will be described later can be performed. Note that the arrangement of the editing screen 401 is merely an example, and another UI may further be provided in accordance with the function to be provided. Note that FIG. 4 shows a result of arranging selected image data on a template. For example, at the center of the editing screen 401 shown in FIG. 4, a result of arranging three image data on the template is displayed.

In step S203, the information processing apparatus 104 loads one or a plurality of selected image data, and determines the resolution (to be referred to as an "image resolution" hereinafter) of each image. In the image resolution determination according to this embodiment, an image resolution is calculated, and it is determined whether the resolution is a high resolution or a low resolution. Since the album size is decided in step S201, a layout size in a case in which one image is arranged for the album size is decided. In addition, since each image to be used is selected in step S202, the number of pixels of the image to be used can be specified, and the image resolution is calculated based on the layout size and the number of pixels.

As a method of calculating the image resolution, in this embodiment, the following method is used. The information processing apparatus 104 obtains the width and height of an image from image data, and calculates the resolution based on the album size selected in step S201. The resolution can be obtained by number of pixels×25.4/size (mm). For example, if an image has a width of 6,000 px and a height of 4,000 px, and the size of one page of a selected album is 150 mm×150 mm, the image resolution is 1,016 dpi (dot per inch) in width and 677 dpi in height. At this time, since the resolution that is lower (in this example, the resolution in height) is 600 dpi or more, the image is determined as a high-resolution image. Similarly, if an image has a width of 6,000 px and a height of 4,000 px, and the size of one page of an album selected in step S201 is 300 mm×300 mm, the image resolution is 508 dpi in width and 338 dpi in height. Since the resolution that is lower (in this example, the resolution in height) is less than 600 dpi, the image is determined as a low-resolution image. Note that in this embodiment, a description will be made assuming that the print resolution in high resolution is 600 dpi, and the print resolution in low resolution is 300 dpi.

The method of deriving the image resolution is not limited to the above-described method. For example, a method of loading image data and switching high resolution/low resolution in accordance with the high-resolution component after frequency analysis may be used. As a method of checking the high-resolution component, Fourier transformation may be performed, and it may be checked whether a predetermined high-resolution component is included. Alternatively, the difference between adjacent pixels may be obtained, and the ratio of differences equal to or larger than a threshold decided in advance may be compared with another threshold decided in advance to perform high-resolution determination. In addition, since Exif (Exchangeable image file format) shooting information is embedded in image data, shooting equipment can be obtained. If this information is referred to, and the image data is image data shot by high-performance shooting equipment, the resolution may be determined as a high resolution. Otherwise, the resolution may be determined as a low resolution.

In step S204, the information processing apparatus 104 loads the selected image data, and determines the color space. The color space of image data is sometimes described in a header (not shown) in the data format of the image data. For example, since Exif includes a color space tag, the information of the tag is read to specify the color space of the image data. A description will be made here assuming that Adobe RGB or sRGB is designated as the color space.

In some cases, a profile is embedded in image data. As the profile, for example, an icc profile can be used here. In this case, an MD5 hash value or the like may be obtained from the embedded icc profile and compared with an MD5 hash value calculated from the icc profile of Adobe RGB prepared in advance to do the determination. Alternatively, a chart image may be prepared, an icc profile embedded in the image data may be applied, and a change in a specific patch of the chart image may be checked for the determination. Note that the information used to specify the color space is not limited to the above-described information, and any other information may be used. Note that the processing order of steps S203 and S204 may be reversed. Note that the information processing apparatus 104 associates the determination results of steps S203 and S204 with the image data of the determination target and stores them.

In step S205, the information processing apparatus 104 determines whether all the selected image data are processed. If unprocessed image data exists (NO in step S205), the process returns to step S203 to repeat the processing for the unprocessed image data. If all the image data are processed (YES in step S205), the process advances to step S206.

In step S206, based on the determination results for all the selected images, the information processing apparatus 104 decides a print resolution and a print color space to be used to print the album to be created. In this embodiment, if the ratio of the number of images determined as low-resolution images to the number of images selected by the user is equal to or less than a predetermined threshold (for example, less than 30%), the print resolution is determined as a high resolution.

In this embodiment, when creating an album, if the resolution of a selected/edited image is lower than a set warning resolution, a warning representing it is output (displayed) for the user. The warning resolution is used as a threshold when notifying the user that it may be impossible to obtain a desired print result because the resolution of the selected/edited image is lower than the print resolution of set album data.

If low-resolution image data is included in the selected image data group, and the image data group is determined as high-resolution image data by the determination, the print quality of the high-resolution image becomes high. On the other hand, at the time of photo album creation, a resolution warning is displayed for a low-resolution image included in the image data group. Even if the resolution warning is displayed, in most cases, the print quality has no problem because it is a warning at the time of high-resolution printing. For this reason, high-resolution printing is performed because printing an image at a resolution as high as possible is advantageous for the user. However, if many low-resolution image data are included in the selected image data group, the resolution warning is frequently output at the time of photo album creation. In some cases, the resolution warning is output for all image data. Even if the print quality is not problematic, the state in which many warnings are output is not preferable from the viewpoint of user convenience in album creation. In this embodiment, control for reducing the warning display is performed. Note that as the control for reducing the warning display, steps S206 and S207 are executed. In this embodiment, the ratio (threshold) used when deciding the print resolution to be used in the determination is set to 30%. However, the present invention is not limited to this. For example, the ratio may be 50%.

This also applies to the print color space. For example, if printing should be performed in Adobe RGB, image data is preferably of Adobe RGB. If image data of sRGB is selected, a warning is preferably output. In this embodiment, for the print color space as well, if the selected image data group includes image data determined as Adobe RGB in a predetermined number or more, the color space is decided as Adobe RGB. If the number of image data is less than the predetermined number, the color space is decided as sRGB. Note that when determining the color space using the icc profile embedded in the image data in step S204, an image in neither sRGB nor Adobe RGB is sometimes included. In this case, since the color space of the album cannot be decided to sRGB or Adobe RGB, in this embodiment, sRGB that is easy to use in general is used for the sake of convenience.

In step S207, the information processing apparatus 104 decides the warning resolution in accordance with the print resolution decided in step S206. If the print resolution is decided as a high resolution in step S206, the warning resolution is set to 600 dpi in accordance with the print resolution. On the other hand, if the print resolution is decided as a low resolution in step S206, the warning resolution is set to 200 dpi lower than the print resolution of 300 dpi. That is, for a user who wants high-resolution printing, it is preferable to set the warning resolution in accordance with the print resolution to make advantage of high-resolution printing. On the other hand, when printing at a low resolution, the image itself, which is selected by the user, may have a resolution lower than the print resolution. For this reason, a resolution that does not make the print quality poor is used as the warning resolution.

Note that the warning resolution described above is merely an example. Even in high-resolution printing, a warning resolution lower than the print resolution may be set. Even in low-resolution printing, a warning resolution equal to the print resolution may be set. In addition, the user may explicitly set a warning resolution for a high resolution and a warning resolution for a low resolution, and a set warning resolution may be used.

In step S208, the information processing apparatus 104 accepts, from the user, album editing using the editing screen 401 shown in FIG. 4. For example, image data may be added to the template by displaying the image list selected in step S202 as thumbnails on the editing screen 401 shown in FIG. 4 and dragging and dropping a thumbnail image to the editing area shown in FIG. 4. For example, the example of FIG. 4 shows a result of laying out three image data on the template. Fourth image data may be added. In addition, the region of the added image data can be changed by dragging a vertex or a side using a mouse. Furthermore, when a trimming region is set for the added image data, trimming can be performed. For example, the trimming region may be set by displaying another trimming screen (not shown) by double click on the image data that is laid out. That is, in step S208, the information processing apparatus 104 accepts editing for the images to be used for album data.

When editing such as replacement of image data, addition of image data, or trimming of image data is performed, the resolution of the image data to be printed actually is decided. That is, for image data already used in album data, the image resolution is redecided. Hence, the information processing apparatus 104 compares the warning resolution decided in step S207 with the redecided resolution of the edited image data. If the resolution to actually print is lower than the warning resolution, the information processing apparatus 104 warns the user of it. That is, based on the result of editing performed by the user for the image to be used in album data, the information processing apparatus 104 warns (notifies) the user of the image whose edited image has a resolution lower than the warning resolution. Note that the method of calculating the image resolution for the edited image data here may be the same as the method used in step S204.

Figure 5:
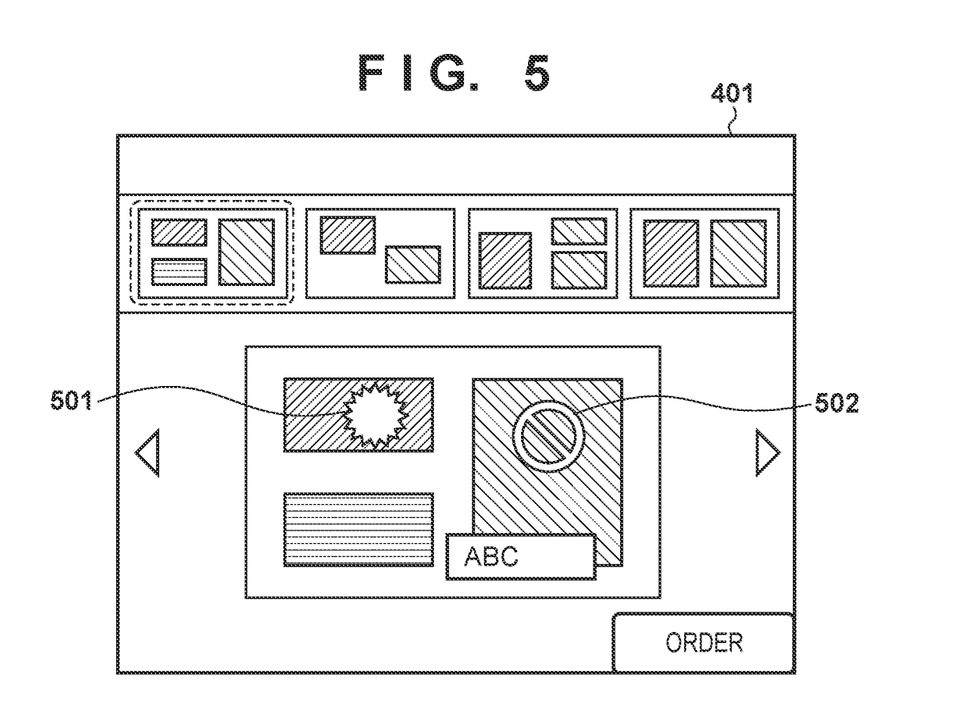
FIG. 5 is a view showing an example of a UI at the time of warning display according to the first embodiment.

FIG. 5 shows an example of screen display when making a warning on the editing screen 401. A warning mark 501 shown in FIG. 5 is displayed on an image, thereby showing, to the user, that the image resolution of the image is lower than the warning resolution. Similarly, concerning the color space as well, if the color space decided in step S206 and the color space of arranged image data are different, a warning mark 502 is displayed on the image, as shown in FIG. 5. The warning mark 502 notifies the user that the color space of the image is different from the color space in printing, and the original tint cannot be expressed. In this state, the user can perform an editing operation such that the warning mark is eliminated by replacing the image on which the warning is displayed or changing the trimming or layout. The warning marks 501 and 502 shown in FIG. 5 are merely examples and are not limited to these. For example, the warning marks for the resolution and the color space may be identifiably displayed by changing the shape or color. Alternatively, the contents of a warning may be displayed by a character string.

In step S209, the information processing apparatus 104 determines the image resolution and the color space of each image data edited in step S208 at the time of an order. The time of the order here corresponds to the timing of pressing the order button 408 on the editing screen 401, as described above. Note that in this embodiment, the order button 408 can be pressed even if the warning mark 501 or 502 is displayed on an image included in the album. In this process, as the methods of determining the image resolution and the color space, the same methods as in steps S203 and S204 are used, and a description thereof will be omitted. Note that the determination processing of step S209 may be performed only for edited image data, or may be performed for all image data arranged on the template.

As the result of the processing, if the selected and edited image data group has the same color space such as that decided in step S206 and has a resolution equal to or higher than the warning resolution decided in step S207, the process directly advances to print processing because printing can be done without any problem. If an image of a different color space or an image check grammar resolution is lower than the warning resolution exists, a preflight screen is displayed.

Figure 6:
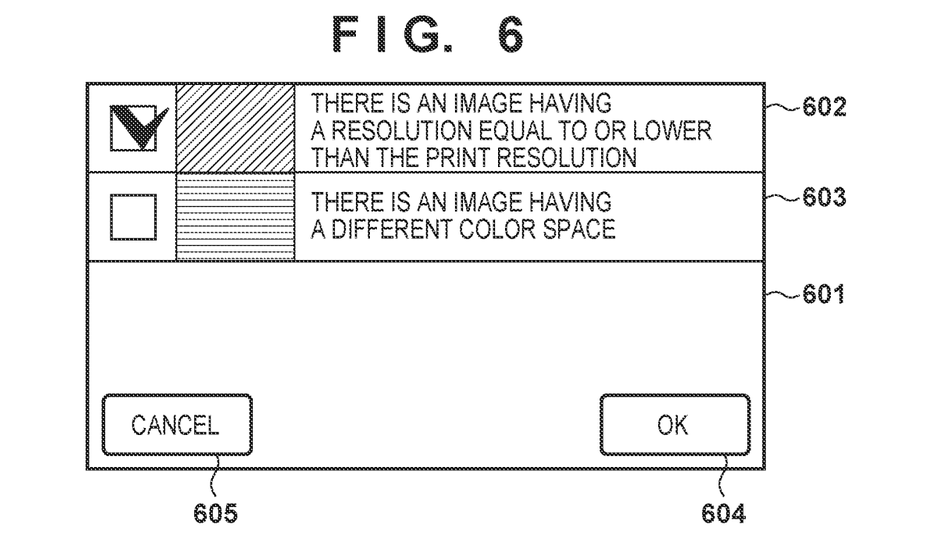
FIG. 6 is a view showing an example of a UI of preflight check according to the first embodiment.

FIG. 6 shows an arrangement example of a preflight screen 601 according to this embodiment. In the preflight screen 601, a warning 602 representing that an image having a resolution equal to or lower than the print resolution is included and a warning 603 representing that an image of a different color space is included are displayed as items, and a corresponding item has a checkmark. Note that the arrangement of the preflight screen 601 is not limited to this. For example, information of a corresponding image may be displayed together in detail. To allow the warning shown in the preflight screen 601 and advance to printing, the user can input a print instruction by pressing an OK button 604. On the other hand, when a cancel button 605 is pressed, the screen returns to the editing screen 401, and editing for changing the color space or print resolution at the time of printing can be performed. At this time, an appropriate print resolution and color space may be decided again using the information of the image resolution and the color space determined in step S209 based on the image data after editing and presented to the user. This makes it possible to set an appropriate print resolution and color space again for the image data after editing.

After that, the printing procedure is ended based on an instruction of the user, and uploading of album data, print processing, and the like are performed.

Thus, the print resolution and the print color space are temporarily decided based on images selected by the user, and warning display control is performed on the editing screen based on the temporarily decided information. It is therefore possible to output an appropriate warning when editing the album even if the user does not set the print resolution or print color space in advance. In addition, when image data is edited based on a warning displayed on the editing screen, print data suitable for a print resolution and a print color space desired by the user can be created. Furthermore, when the print resolution and the print color space are set again based on the result of actual layout before printing, printing can be performed based on the result of editing by the user. The information processing apparatus 104 decides the warning resolution in step S207 before the editing operation in step S208 is performed. For this reason, the information processing apparatus 104 can display a warning mark as shown in FIG. 5 for the edited image data by comparing the image resolution set again based on the result of actual layout in step S208 with the warning resolution. Note that this also applies to the color space.

Note that in the above-described example, one print resolution and one color space are decided for one album. However, the present invention is not limited to this. For example, in some cases, a printer capable of handling different print resolutions or color spaces is used, or a plurality of printers of different output characteristics can be used. In such a case, a print resolution and a color space may be decided for, for example, each page of one album (bookbinding product).

Second Embodiment

In the first embodiment, a case in which the user manually selects image data to be laid out in an album and lays them out has been described. The present invention can also be applied when automatically creating the layout of an album. As the second embodiment of the present invention, an arrangement example in a case of automatic layout will be described. Note that a description of the same arrangement as in the first embodiment will be omitted.

[Processing Procedure]

Figure 7:
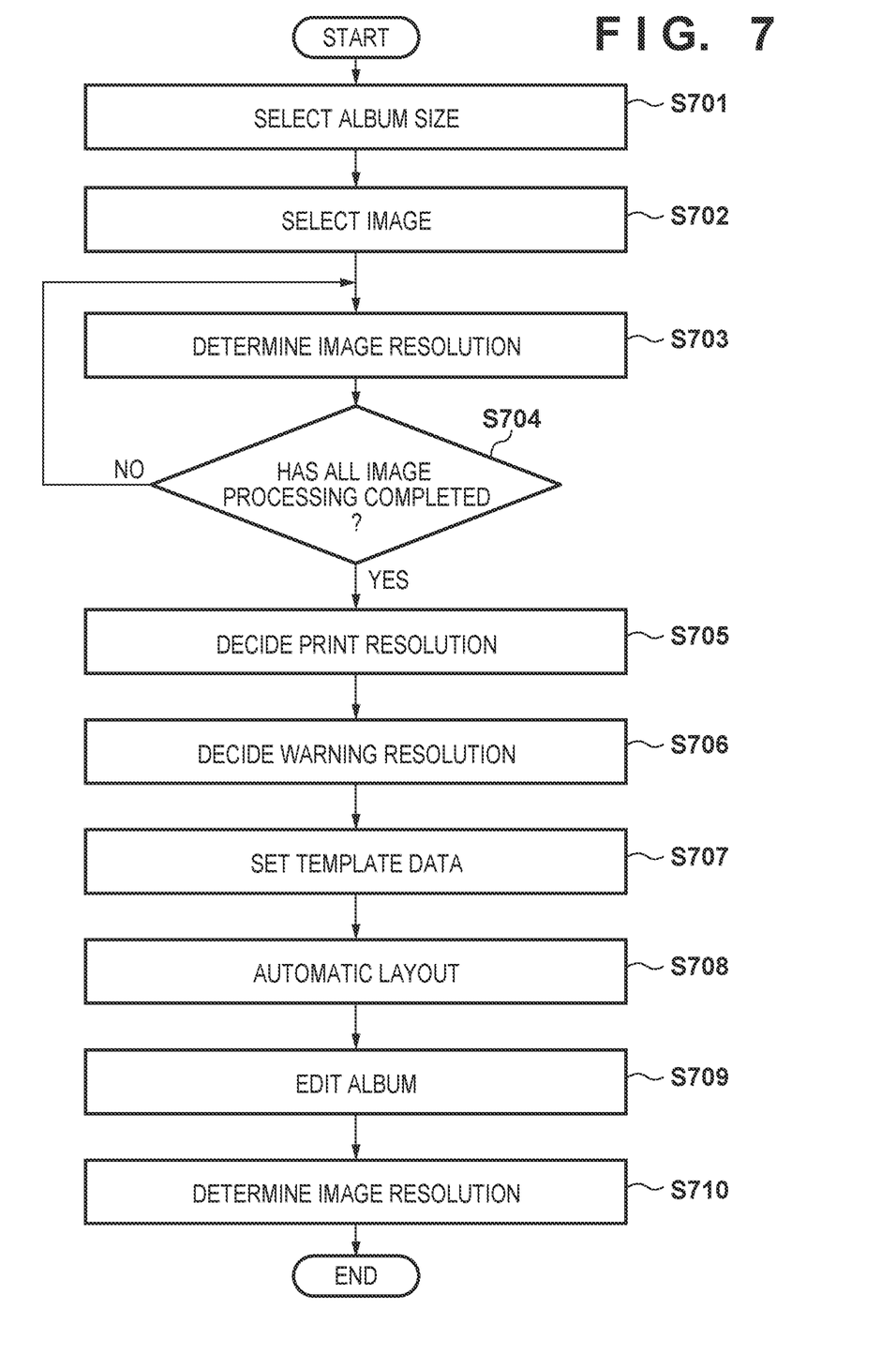
FIG. 7 is a flowchart of processing according to the second embodiment.

FIG. 7 is a flowchart of processing according to this embodiment. In this embodiment, a description will be made assuming that the processing is performed by an information processing apparatus 104, as described with reference to FIG. 2 of the first embodiment. A resolution will be described as an example.

The processes of steps S701 to S703 are the same as the processes of steps S201 to S203 in FIG. 2, and a description thereof will be omitted. After image resolution determination processing in step S703, in step S704, the information processing apparatus 104 determines whether all selected image data are processed. In the processing of the information processing apparatus 104, if unprocessed image data exists (NO in step S704), the process returns to step S703 to repeat the processing for the unprocessed image data. If all the image data are processed (YES in step S704), the process advances to step S705.

In step S705, based on the determination results for all the selected images, the information processing apparatus 104 decides the print resolution of the album. The decision method here can be the same as the method used in step S206 of FIG. 2.

In step S706, the information processing apparatus 104 decides the warning resolution based on the print resolution decided in step S705. The decision method here can be the same as the method used in step S207 of FIG. 2.

In step S707, the information processing apparatus 104 decides template data to be used to create the album. A plurality of template data are defined and held in advance, and template data is selected from them. More specifically, template data in which image data in number selected in step S702 can be arranged and which corresponds to the print resolution decided in step S705 is selected.

Figure 8:
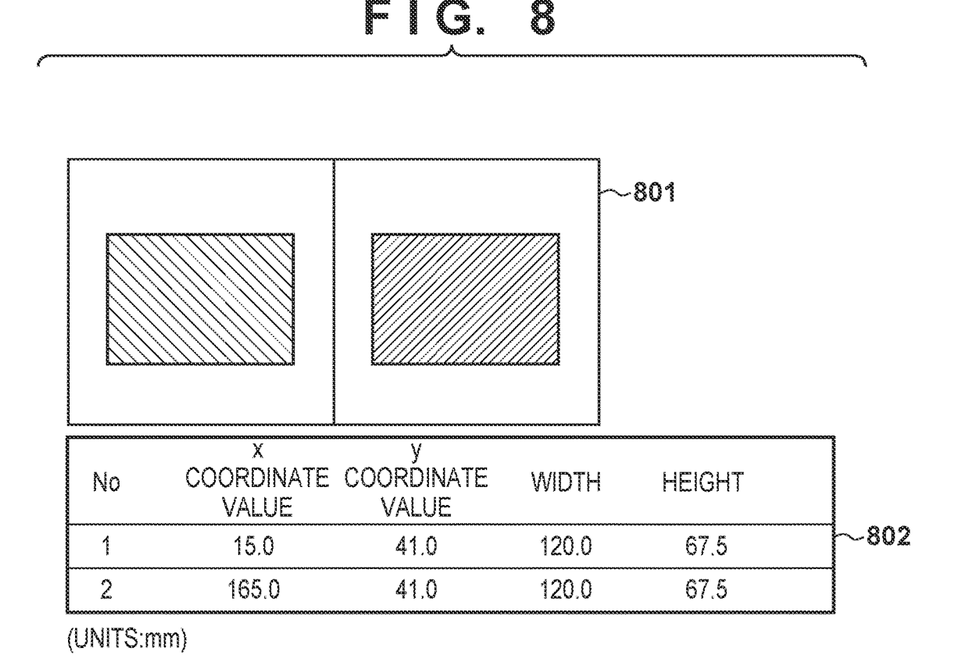
FIG. 8 is a view showing an example of template data for a high-resolution image according to the second embodiment.
Figure 9:
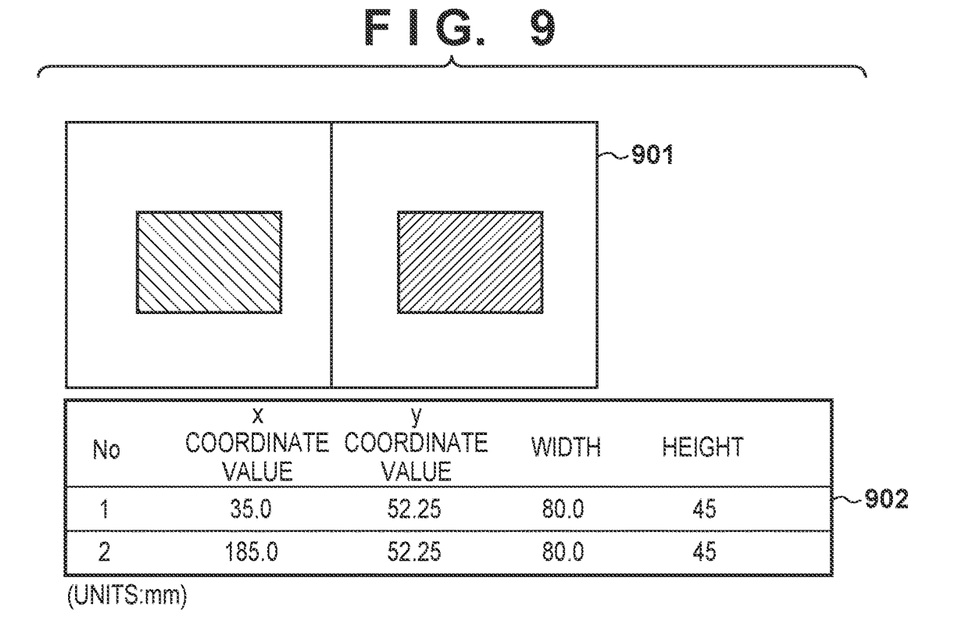
FIG. 9 is a view showing an example of template data for a low-resolution image according to the second embodiment.

For example, if the selected image data group is determined to have a high resolution, template data 801 to arrange each image large, as shown in FIG. 8, is selected. In this case, since images capable of maintaining print quality even when printed on a whole page in the album size selected in step S701 are selected, a template to arrange the images large is selected to take advantage of the images, and the images are laid out. On the other hand, if the selected image data group is determined to have a low resolution, template data 901 to arrange each image small, as shown in FIG. 9, is selected. If the images are printed on a whole page in the album size selected in step S701, print quality may decrease because of the low resolution. Hence, template data to arrange the image data small is selected to maintain the print resolution when the images are laid out. In the template data, information 802 or 902 of a region to arrange the image data is displayed, as shown in FIG. 8 or 9. More specifically, the information includes the size and coordinates of each region in the template. The coordinates shown in the information 802 or 902 can be expressed as, for example, distances from an origin that is set to the upper left corner (0, 0) of the template. In addition, identification information used to uniquely identify each region may be added.

Note that if image data in number that cannot be fitted in the selected template data are selected, the information processing apparatus 104 gives unique priority based on image rating information embedded in the image data or a result of analyzing the image data. The information processing apparatus 104 can arrange the image data after decreasing the number of image data such that the images are fitted in the template data, for example, in descending order of rating value.

In step S708, the information processing apparatus 104 lays out the image data selected in step S702 on the template data selected in step S707. For example, the image data are arranged in the order of shooting date/time, an order is added in advance to each image slot of the prepared template, and the images are laid out in the order of shooting date/time. Note that the method of automatic layout of image data is not particularly limited, and may be executed based on the selected image data and template data. The result of automatic result is displayed in, for example, an editing screen 401 shown in FIG. 4. Note that the slot is a region used to arrange image data and set in the template in advance.

In step S709, the information processing apparatus 104 accepts, from the user, album editing using the editing screen 401 shown in FIG. 4. The process of this step is the same as step S208 in FIG. 2, and a description thereof will be omitted.

In step S710, the information processing apparatus 104 determines the print resolution of the image data edited in step S709 at the time of an order. In this step, as the print resolution determination method, the same method as in step S703 is used, and a description thereof will be omitted. As the result of the processing, if the image resolution is equal to or higher than the warning resolution decided in step S705, the process directly advances to print processing because printing can be done without any problem. If an image whose resolution is lower than the warning resolution exists, a preflight screen 601 shown in FIG. 6 is displayed. The subsequent processing is the same as in the first embodiment.

Thus, even in a case in which automatic layout is performed, it is possible to decide a resolution or a color space suitable for editing and printing in consideration of user convenience at the time of album creation.

Other Embodiments

In the above embodiments, processing when creating album data has been described. The processing according to the above-described embodiments may be used when creating data for another purpose. For example, when creating print data used to print a document on one side of a paper sheet, the processing according to the above-described embodiments may be used.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-043040, filed Mar. 8, 2019, which is hereby incorporated by reference herein in its entirety.

What is claimed is:

1. A photo album creation system configured to create album data used to create an album in which a plurality of images are laid out, the system comprising:
one or more processors; and
one or more memories storing instructions that, when executed by the one or more processors, cause the photo album system to:
(1) determine, based on information of each of the plurality of images, a notification resolution used to make a notification;
(2) determine, based on information of a color space of each of the plurality of images, a color space used to make a notification; and
(3) perform notification processing to (a) provide identifiable notification regarding an image whose resolution is less than the notification resolution, in the images used for the album data and (b) provide identifiable notification regarding an image whose color space is different from the color space used to make a notification, in the images used for the album data.

2. The system according to claim 1, wherein upon accepting an instruction of output to the album data, if an image having a resolution less than the notification resolution is included in the album data, the notification processing is performed.

3. The system according to claim 1, wherein the resolution for the image is determined based on a result of editing performed for the image used for the album data, and
wherein the notification processing is performed for an image whose determined resolution is less than the notification resolution.

4. The system according to claim 1, wherein upon accepting an instruction of output to the album, if the image of the color space different from the determined color space is included in the album, the notification processing is performed.

5. The system according to claim 1, wherein the information of the color space of the image is obtained from one of (a) shooting information and (b) a profile added to the image.

6. The system according to claim 1, wherein the one or more memories further store instructions that, when executed by the one or more processors, cause the photo album system to:
accept selection of an image from a user;
specify, based on the image of the accepted selection, a template to lay out the image; and
lay out the image on the specified template.

7. A photo album creation method for creating album data used to create an album in which a plurality of images are laid out, the method comprising:
determining, based on information of each of the plurality of images, a notification resolution used to make a notification;
determining, based on information of a color space of each of the plurality of images, a color space used to make a notification; and
performing notification processing to (a) provide identifiable notification regarding an image whose resolution is less than the notification resolution, in the images used for the album data and (b) provide identifiable notification regarding an image whose color space is different from the color space used to make a notification, in the images used for the album data.

8. The method according to claim 7, wherein upon accepting an instruction of output to the album data, if an image having a resolution less than the notification resolution is included in the album data, the notification processing is performed.

9. The method according to claim 7, wherein the resolution for the image is determined based on a result of editing performed for the image used for the album data, and
wherein the notification processing is performed for an image whose determined resolution is less than the notification resolution.

10. The method according to claim 7, wherein upon accepting an instruction of output to the album, if the image of the color space different from the determined color space is included in the album, the notification processing is performed.

11. The method according to claim 7, wherein the information of the color space of the image is obtained from one of (a) shooting information and (b) a profile added to the image.

12. The system according to claim 1, wherein if a number of images whose resolution is equal to or more than a first resolution is equal to or more than a predetermined value, then the first resolution is used as the notification resolution, and
wherein if the number of images whose resolution is equal to or more than the first resolution is less than the predetermined value, then a second resolution less than the first resolution is used as the notification resolution.

13. A photo album creation system configured to create album data used to create an album in which a plurality of images are laid out, the system comprising:
one or more processors; and
one or more memories storing instructions that, when executed by the one or more processors, cause the photo album system to:
(1) determine, based on information of a color space of each of the plurality of images, a color space used to make a notification; and
(2) provide identifiable notification regarding an image whose color space is different from the determined color space, in the images used for the album data.

14. The system according to claim 13, wherein if a number of images whose color space is a first color space used to make a notification is equal to or more than a predetermined value, then the first color space is used as the color space used to make a notification, and wherein if the number of images whose color space is the first color space is less than the predetermined value, then a second color space different from the first color space is used as the color space used to make a notification.

* * * * *